United States Patent [19]

Pearson

[11] Patent Number: 5,715,478
[45] Date of Patent: Feb. 3, 1998

[54] ONE-TIME-USE CAMERA HAVING MAIN BODY PART WITH INTEGRAL FILM RAILS AND INSERTABLE LIGHT BAFFLE WITH RAIL EXTENSIONS

[75] Inventor: Douglas H. Pearson, Rochester, N.Y.

[73] Assignee: Eastman Kodak Company, Rochester, N.Y.

[21] Appl. No.: 812,262

[22] Filed: Mar. 6, 1997

[51] Int. Cl.⁶ .................................................. G03B 17/02
[52] U.S. Cl. ..................................................... 396/6; 396/538
[58] Field of Search ................................. 396/6, 440, 535, 396/538, 541

[56] References Cited

U.S. PATENT DOCUMENTS

| | | | |
|---|---|---|---|
| 4,609,271 | 9/1986 | Watanabe | 396/538 |
| 4,833,495 | 5/1989 | Ohmura et al. | 396/6 X |
| 4,855,774 | 8/1989 | Ohmura et al. | 396/6 |
| 4,954,857 | 9/1990 | Mochida et al. | 396/6 |
| 5,181,057 | 1/1993 | Takagi et al. | 396/6 X |
| 5,302,992 | 4/1994 | Fuss et al. | 396/535 X |
| 5,438,380 | 8/1995 | Muramatsu | 396/535 X |
| 5,530,507 | 6/1996 | Boyd | 396/6 |
| 5,555,063 | 9/1996 | Balling | 396/538 |

FOREIGN PATENT DOCUMENTS 5-61110  3/1993  Japan .

*Primary Examiner*—Howard B. Blankenship
*Attorney, Agent, or Firm*—Roger A. Fields

[57] ABSTRACT

A one-time-use camera comprising a main body part having a light-receiving and film roll chambers and an integral pair of parallel film rails located alongside the light-receiving chamber, and a separate-part light baffle inserted into the light-receiving chamber between the film rails, is characterized in that the light baffle has an integral pair of parallel film rails that are aligned with the respective film rails of the main body part to serve as a longitudinal extension of the respective film rails of the main body part from the light-receiving chamber to the film roll chamber.

6 Claims, 3 Drawing Sheets

ONE-TIME-USE CAMERA HAVING MAIN BODY PART WITH INTEGRAL FILM RAILS AND INSERTABLE LIGHT BAFFLE WITH RAIL EXTENSIONS

CROSS-REFERENCE TO INCORPORATED PATENT

U.S. Pat. No. 5,530,507, issued Jun. 25, 1996 in the name of James D. Boyd and entitled METHOD OF ASSEMBLING ONE-TIME-USE CAMERA is incorporated in this application.

FIELD OF THE INVENTION

The invention relates generally to the field of photography, and in particular to one-time-use cameras. More specifically, the invention relates to a one-time-use camera having a main body part with integral film rails and a light baffle with rail extensions.

BACKGROUND OF THE INVENTION

Film and cameras that are all in one, commonly referred to as single-use or one-time-use cameras, have become well known. Typically, the one-time-use camera is a simple point-and-shoot type comprising a plastic main body part which supports a fixed-focus-taking lens, a film metering mechanism with a rotatably supported metering sprocket, a manually rotatable film advance thumbwheel, a single-blade shutter, a manually depressible shutter release button, a frame counter for indicating the number of exposures remaining for picture-taking, a direct see-through viewfinder, a film cartridge, and in some models an electronic flash. A pair of plastic front and rear cover parts house the main body part between them to complete the camera unit. The rear cover part connects to the main body part and/or to the front cover part to make the main body part light-tight. A decorative cardboard outer box or label at least partially contains the camera unit and may have respective openings for the taking lens, the shutter release button, the film advance thumbwheel, the viewfinder, the frame counter, and a flash emission window for the electronic flash.

At the manufacturer, a film leader protruding from the film cartridge is attached to a film take-up spool, a cartridge receiving chamber in the main body part is loaded with the film cartridge, a film supply chamber in the main body part is loaded with the take-up spool, and the front and rear cover parts are connected to the main body part and/or to the front cover part to complete the camera unit. Then, an engageable end of the take-up spool, which protrudes from the film roll chamber, is rotated to factory prewind substantially the entire length of an unexposed filmstrip from the film cartridge onto the take-up spool. Lastly, the outer box is placed on the camera unit.

Prior art U.S. Pat. No. 5,555,063, issued Sep. 10, 1996, and 5,530,507, issued Jun. 25, 1966, appear to disclose a method of assembling the main body part and a separate-part light baffle of the one-time-use camera, which includes the step of inserting the light baffle into a light-receiving or exposing chamber located between the cartridge receiving and film roll chambers in the main body part. As shown in the '063 patent, an integral pair of parallel film rails of the main body part longitudinally extend from alongside the light-receiving chamber to the film roll chamber in order to guide the unexposed filmstrip onto the take-up spool when the take-up spool is rotated to factory prewound the unexposed filmstrip from the film cartridge onto the take-up spool.

To use the one-time-use camera, after the photographer takes a picture, he or she manually rotates the thumbwheel in a film winding direction to rotate a film spool inside the film cartridge, to wind an exposed section of the filmstrip into the film cartridge. The rewinding movement of the filmstrip the equivalent of slightly more than one frame width rotates the metering sprocket to decrement the frame counter to its next lower-numbered setting and to pivot a metering lever into engagement with the thumbwheel to prevent further manual rotation of the thumbwheel. Manually depressing the shutter release button to take another picture pivots the metering lever out of engagement with the thumbwheel to permit renewed rotation of the thumbwheel. When the maximum number of exposures available on the filmstrip are exposed, and the filmstrip is completely wound off the take-up spool and rewound into the film cartridge, the one-time-use camera is given to a photofinisher who tears the outer box off the camera unit, separates the rear cover part from the main body part, and removes the film cartridge with the filmstrip from the cartridge receiving chamber. Then, he removes the filmstrip from the film cartridge to develop the negatives and make prints for the customer, and he forwards the used camera parts to the manufacturer for recycling, i.e. remanufacture.

SUMMARY OF THE INVENTION

According to one aspect of the invention, a one-time-use camera comprising a main body part having a light-receiving and film roll chambers and an integral pair of parallel film rails located alongside the light-receiving chamber, and a separate-part light baffle inserted into the light-receiving chamber between the film rails, is characterized in that:

the light baffle has an integral pair of parallel film rails that are aligned with the respective film rails of the main body part to serve as a longitudinal extension of the respective film rails of the main body part from the light-receiving chamber to the film roll chamber.

According to another aspect of the invention, a method of assembling a main body part of a one-time use camera and a separate-part light baffle of the one-time-use camera comprising the step of inserting the light baffle into a light-receiving chamber of the main body part and between an integral pair of parallel film rails of the main body part that are alongside the chamber, is characterized in that:

an integral pair of parallel film rails of the light baffle are aligned with the respective film rails of the main body part to serve as a longitudinal extension of the respective film rails of the main body part when the light baffle is inserted into the light-receiving chamber.

DETAILED DESCRIPTION OF THE INVENTION

The invention is disclosed as being embodied preferably in a one-time-use camera such as shown in incorporated U.S. Pat. No. 5,530,507. Because the features of a one-time-use camera have become generally known, the description which follows is directed in particular only to those elements forming part of or cooperating directly with the disclosed embodiment. It is to be understood, however, that other elements may take various forms known to a person of ordinary skill in the art.

Figure 1:
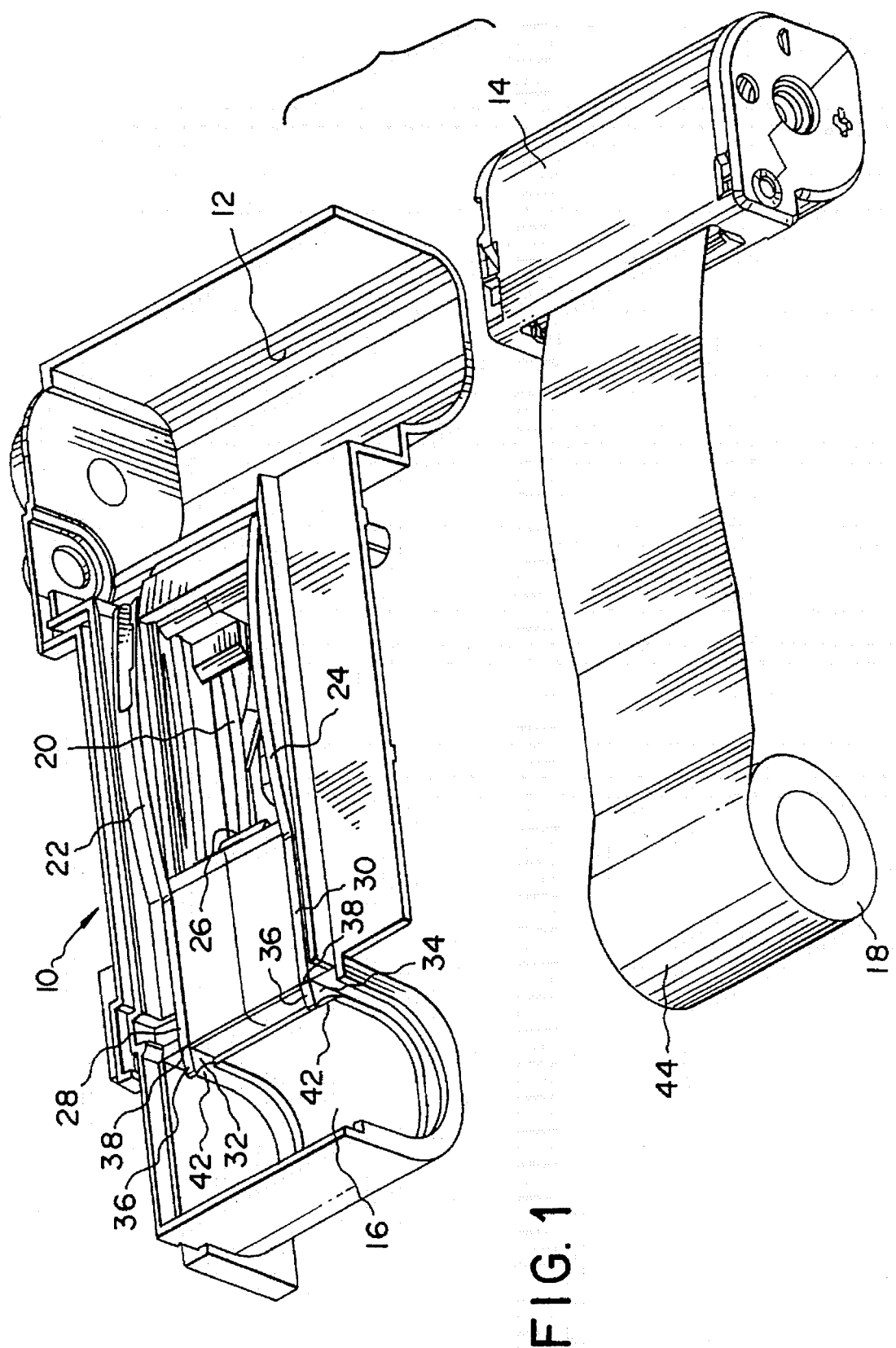
FIG. 1 is an assembled perspective view of the main body part and the light baffle, pursuant to a preferred embodiment of the invention.
Figure 2:
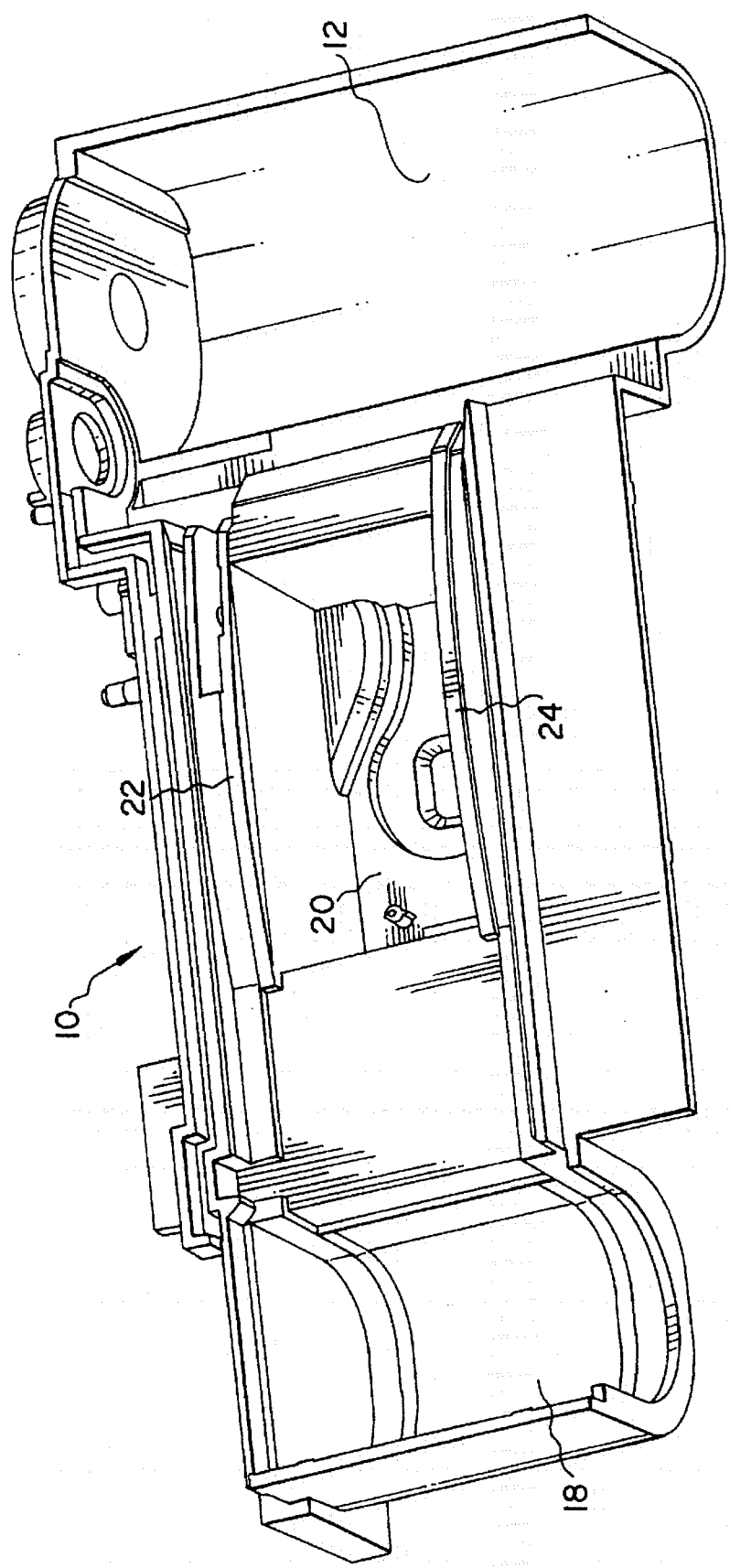
FIG. 2 is a perspective view of the main body part by itself.
Figure 3:
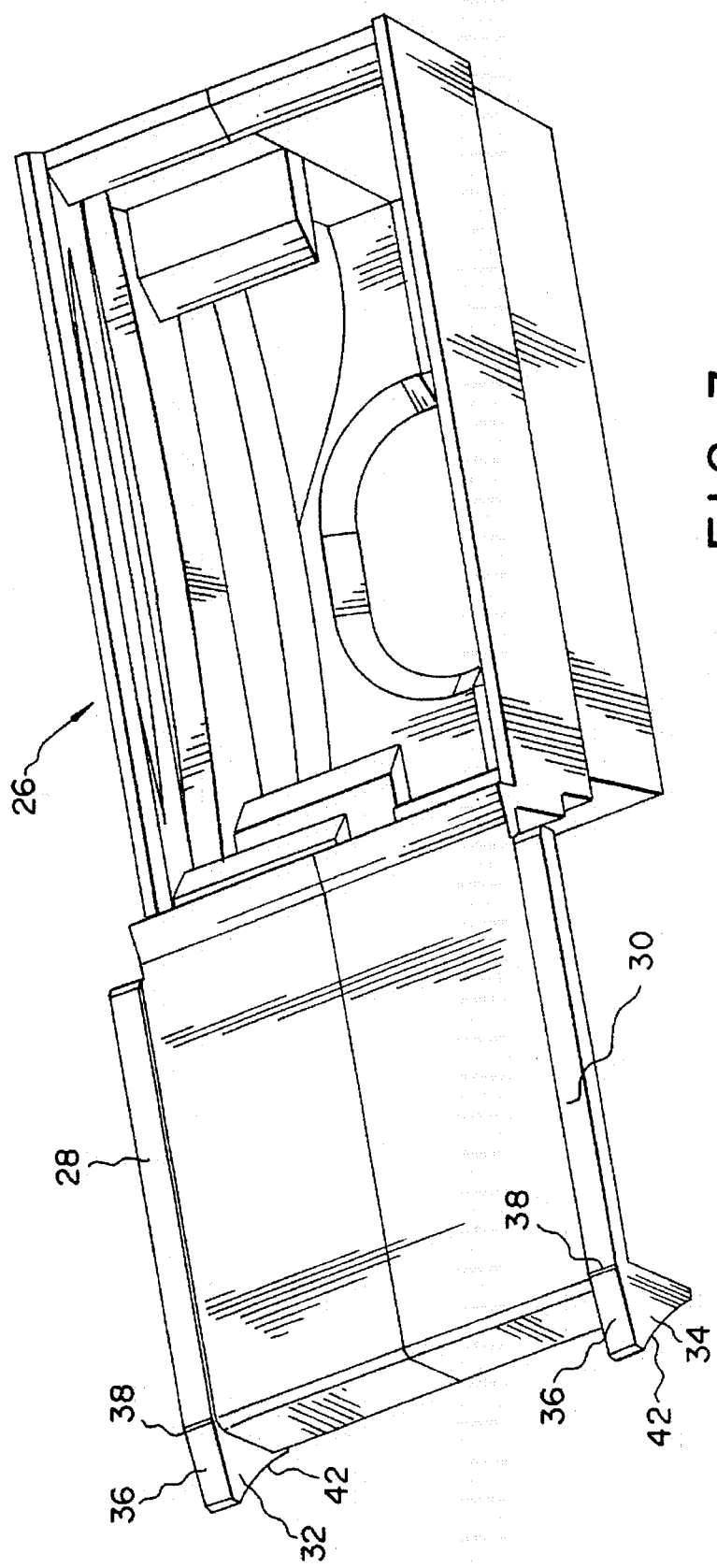
FIG. 3 is a perspective view of the light baffle by itself.

Referring now to the drawings, FIGS. 1–3 show certain parts of a one-time-use camera comprising a main body part 10 having a cartridge receiving chamber 12 for a film cartridge 14, a film roll chamber 16 for an unexposed film roll 18 which is pre-wound from the film cartridge, and a light-receiving or exposing chamber 20 located between the two other chambers. A pair of parallel film rails 22 and 24 integrally formed with the main body part 10 are located longitudinally alongside the light-receiving chamber 20. A separate-part light baffle 26 is intended to be inserted into the light-receiving chamber 20 between the film rails 22 and 24.

The light baffle 26 has an integral pair of parallel film rails 28 and 30 that are aligned with the respective film rails 22 and 24 of the main body part 10, to serve as a longitudinal extension of the respective film rails of the main body part from the light-receiving chamber 20 to the film roll chamber 16, when the light baffle is inserted into the light-receiving chamber. See FIG. 1.

As shown in FIGS. 1 and 2, the light baffle 26 has an integral pair of parallel anti-clockspringing film retainers 32 and 34 that project from the respective film rails 28 and 30 of the light baffle to partially over the film roll chamber 16 primarily to retain the unexposed film roll 18 in that chamber when the light baffle is in the light-receiving chamber 20. Each of the film retainers 32 and 34 has an integral flat film-supporting portion 36 that is inclined from one of the respective ends 38 of the film rails 28 and 30 of the light baffle 26 to partially into the film roll chamber 16, and it has an integral curved film-retaining portion 42 that is located farther within the film roll chamber than the film-supporting portion to contact an outermost film convolution 44 of the unexposed film roll 18 to prevent the unexposed film roll from clock-springing partway out of that chamber.

The invention has been described with reference to a preferred embodiment. However, it will be appreciated that variations and modifications can be effected by a person of ordinary skill in the art without departing from the scope of the invention.

PARTS LIST 10. main body part
12. cartridge receiving chamber
14. film cartridge
16. film roll chamber
18. unexposed film roll
20. light-receiving chamber
22. film rail
24. film rail
26. light baffle
28. film rail
30. film rail
32. film retainer
34. film retainer
36, 36. film-guiding portions
38, 38. rail ends
42. film-retaining portion
44. outermost film convolution

What is claimed is:

1. A one-time-use camera comprising a main body part having a light-receiving and film roll chambers and an integral pair of parallel film rails located alongside said light-receiving chamber, and a separate-part light baffle inserted into said light-receiving chamber between said film rails, is characterized in that:

said light baffle has an integral pair of parallel film rails that are aligned with the respective film rails of said main body part to serve as a longitudinal extension of the respective film rails of the main body part from said light-receiving chamber to said film roll chamber.

2. A one-time-use camera as recited in claim 1, wherein said light baffle has an integral pair of parallel anti-clockspringing film retainers that project from the respective film rails of the light baffle to partially over said film roll chamber to prevent an unexposed film roll in that chamber from clock-springing partway out of the chamber.

3. A one-time-use camera as recited in claim 1, wherein said light baffle has an integral pair of flat film-supporting portions that are inclined from the respective film rails of said light baffle to partially into said film roll chamber and it has an integral pair of curved film-retaining portions that are located farther within the film roll chamber than said film-supporting portions to contact an outermost film convolution of an unexposed film roll in that chamber in order to prevent the unexposed film roll from clock-springing partway out of that chamber.

4. A light baffle for use with a one-time-use camera that includes a main body part having a light-receiving chamber and a pair of parallel film rails located alongside the chamber, which is adapted to be inserted into the chamber between the film rails, is characterized in that:

said light baffle has a pair of parallel film rails that are configured for alignment with the respective film rails of the main body part when the light baffle is inserted into the chamber, to serve as a longitudinal extension of the respective film rails of the main body part.

5. A light baffle as recited in claim 4, 10 wherein said light baffle has an integral pair of parallel anti-clockspringing film retainers projecting from the respective film rails of the light baffle that are configured to be positioned partially over a film roll chamber of the main body part, when the light baffle is inserted into the light-receiving chamber of the main body part, in order to prevent an unexposed film roll in the film roll chamber from clock-springing partway out of that chamber.

6. A method of assembling a main body part of a one-time use camera and a separate-part light baffle of the one-time-use camera comprising the step of inserting the light baffle into a light-receiving chamber of the main body part and between an integral pair of parallel film rails of the main body part that are alongside the chamber, is characterized in that:

an integral pair of parallel film rails of the light baffle are aligned with the respective film rails of the main body part to serve as a longitudinal extension of the respective film rails of the main body part when the light baffle is inserted into the light-receiving chamber.

* * * * *